US012651196B2

(12) United States Patent (10) Patent No.: US 12,651,196 B2
Suzani et al. (45) Date of Patent: Jun. 9, 2026

(54) AUTOMATICALLY CHANGE ANOMALY DETECTION THRESHOLD BASED ON PROBABILISTIC DISTRIBUTION OF ANOMALY SCORES

(71) Applicant: Oracle International Corporation, Redwood Shores, CA (US)

(72) Inventors: Amin Suzani, Vancouver (CA); Matteo Casserini, Zurich (CH); Milos Vasic, Zurich (CH); Saeid Allahdadian, Vancouver (CA); Andrew Brownsword, Vancouver (CA); Hamed Ahmadi, Burnaby (CA); Felix Schmidt, Baden-Daettwil (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1018 days.

(21) Appl. No.: 17/122,401

(22) Filed: Dec. 15, 2020

(65) Prior Publication Data

US 2022/0188694 A1 Jun. 16, 2022

(51) Int. Cl.
| | |
|---|---|
| *G06N 20/00* | (2019.01) |
| *G06F 17/18* | (2006.01) |
| *G06N 7/01* | (2023.01) |

(52) U.S. Cl.
CPC ............. *G06N 20/00* (2019.01); *G06F 17/18* (2013.01); *G06N 7/01* (2023.01)

(58) Field of Classification Search
CPC ........... G06N 20/00; G06N 7/01; G06F 17/18
See application file for complete search history.

(56) References Cited

U.S. PATENT DOCUMENTS

| | | | |
|---|---|---|---|
| 10,069,900 | B2 | 9/2018 | Poola et al. |
| 2009/0091443 | A1* | 4/2009 | Chen .................. G06F 18/2433 340/540 |

(Continued)

FOREIGN PATENT DOCUMENTS

| | | | |
|---|---|---|---|
| KR | 20200164008 | 11/2020 | |
| WO | WO-2020185101 A9 | 1/2021 | |
| WO | WO-2021176460 A1 * | 9/2021 | .......... H04W 12/121 |

OTHER PUBLICATIONS

Li et al. "Dlog: diagnosing router events with syslogs for anomaly detection." The Journal of Supercomputing 74 (2018) (Year: 2018).*

(Continued)

*Primary Examiner* — Adam C Standke
(74) *Attorney, Agent, or Firm* — Hickman Becker; Bingham Ledesma LLP

(57) ABSTRACT

Approaches herein relate to model decay of an anomaly detector due to concept drift. Herein are machine learning techniques for dynamically self-tuning an anomaly score threshold. In an embodiment in a production environment, a computer receives an item in a stream of items. A machine learning (ML) model hosted by the computer infers by calculation an anomaly score for the item. Whether the item is anomalous or not is decided based on the anomaly score and an adaptive anomaly threshold that dynamically fluctuates. A moving standard deviation of anomaly scores is adjusted based on a moving average of anomaly scores. The moving average of anomaly scores is then adjusted based on the anomaly score. The adaptive anomaly threshold is then adjusted based on the moving average of anomaly scores and the moving standard deviation of anomaly scores.

20 Claims, 7 Drawing Sheets

(56) References Cited

U.S. PATENT DOCUMENTS

| | | | |
|---|---|---|---|
| 2016/0092516 | A1 | 3/2016 | Poola et al. |
| 2017/0169360 | A1 | 6/2017 | Veeramachaneni et al. |
| 2018/0095004 | A1 | 4/2018 | Ide et al. |
| 2018/0109589 | A1 | 4/2018 | Ozaki et al. |
| 2019/0095300 | A1* | 3/2019 | Oba .................. G05B 23/0281 |
| 2019/0370610 | A1* | 12/2019 | Batoukov ........... G06F 11/0709 |
| 2020/0045064 | A1 | 2/2020 | Bindal |
| 2020/0076841 | A1 | 3/2020 | Hajimirsadeghi |
| 2020/0201727 | A1 | 6/2020 | Nie |
| 2022/0138504 | A1 | 5/2022 | Moghadam et al. |
| 2022/0156578 | A1 | 5/2022 | Allahdadian et al. |
| 2022/0188410 | A1 | 6/2022 | Allahdadian et al. |

OTHER PUBLICATIONS

Ross et al. "Exponentially weighted moving average charts for detecting concept drift." Pattern recognition letters 33.2 (2012) (Year: 2012).*

Li et al. "Dlog: diagnosing router events with syslogs for anomaly detection." The Journal of Supercomputing 7 4 (Year: 2018).*

Hinton, Geoffrey, "A Practical Guide to Training Restricted Boltzmann Machines", Version 1, dated Aug. 2, 2010, 21 pages.

Ackerman et al., "Measures of Clustering Quality: A Working Set of Axioms for Clustering", dated 2009, 8 pages.

Ghosh et al., "Detecting Anomalous and Unknown Intrusions Against Programs", dated 1998, 9 pages.

Gody, Daniel, "Understanding binary cross-entropy / log loss: a visual explanation", dated Nov. 21, 2018, 13 pages.

Goix, Nicolas, "How to Evaluate the Quality of Unsupervised Anomaly Detection Algorithms?", Presented at ICML 2016 Anomaly Detection Workshop, New York, NY, USA, 2016, 13 pages.

Golan et al., "Deep Anomaly Detection Using Geometric Transformations", 32nd Conference on Neural Information Processing Systems (NeurIPS dated 2018), Montréal, Canada, 12 pages.

HaddadPajouh et al, "A Two-layer Dimension Reduction and Two-tier Classification Model for Anomaly-Based Intrusion Detection in IoT Backbone Networks", dated 2016, 12 pages.

Du et al. DeepLog: Anomaly Detection and Diagnosis from System Logs through Deep Learning, CCS'17, Oct. 30-Nov. 3, 2017, 14 pages.

Hill et al., "Learning Distributed Representations of Sentences from Unlabelled Data", dated Feb. 10, 2016, 11 pages.

Dong et al., "Quality-Based Dynamic Threshold for Iris Matching", IEEE, dated 2009, 4 pages.

Hochreiter, Sepp, "Long Short Term Memory", Nural Computation, dated Nov. 15, 1997, 46 pages.

Hu et al., "Anomalous User Activity Detection in Enterprise Multi-Source Logs", dated Nov. 2017, 8 pages.

Jain et al., "Score normalization in multimodal biometric systems", Pattern Recognition 38, dated Jan. 2005, 16 pages.

Kim et al., "Behavior-based anomaly detection on big data", Edith Cowan University, Research Online, dated 2015, 9 pages.

Kiros et al., "Skip-Thought Vectors", dated 2015, 9 pages.

Koenker et al. "Quantile Regression", Journal of Economic Perspectives, vol. 15, No. 4, dated 2001, 129 pages.

Kolosnjaji et al., "Deep Learning for Classification of Malware System Call Sequences", dated 2016, 12 pages.

Halkidi et al., "On Clustering Validation Techniques", Journal of Intelligent Information Systems, dated 2001, 39 pages.

Buczak et al., "A Survey of Data Mining and Machine Learning Methods for Cyber Security Intrusion Detection", IEEE Communications Surveys & Tutorials, vol. 18, No. 2, Second Quarter 2016, 24 pages.

Ackerman, Margareta, "A Theoretical Study of Clusterability and Clustering Quality", Waterloo, Ontario, Canada, dated 2007, 76 pages.

Alexey Tsymbal, "The Problem of Concept Drift: Definitions and Related Work", dated Apr. 29, 2004, 7 pages.

Anonymous authors, "Versatile Outlier Detection With Outlier Preserving Distribution Mapping Autoencoders", conference paper at ICLR 2020, dated 2019, 13 pages.

Bach et al., A Bayesian Approach to Concept Drift, dated 2010, 9 pages.

Bengio et al., "A Neural Probabilistic Language Model", Journal of Machine Learning Research 3, dated Feb. 2003, 19 pages.

Berlin et al., "Malicious Behavior Detection using Windows Audit Logs", dated Aug. 25, 2015, 10 pages.

Gama et al., "A Survey on Concept Drift Adaptation", ACM Computing Surveys, vol. 1, No. 1, Article 1, Publication date: Jan. 2013, 44 pages.

Browniee_Jason, "A Gentle Introduction to Cross-Entropy for Machine Learning", dated Oct. 21, 2019, https://machinelearningmastery.com/cross-entropy-for-machine-learning/, 34 pages.

Liu et al., "Detecting and Preventing Cyber Insider Threats: A Survey", IEEE Communications Survey & Tutorials, dated 2018, 21 pages.

Chakraborty et al., "Early detection of faults in HVAC systems using an XGBoost model with a dynamic threshold", Energy and Buildings, dated 2019, pp. 326-344.

Chandola et al., "Anomaly Detection : A Survey", ACM Computing Surveys, dated Sep. 2009, 75 pages.

Chang et al., "A Dynamic Threshold Decision System for Stock Trading Signal Detection", Applied Soft Computing 11, dated 2011, 13 pages.

Clemencon et al., "Scoring anomalies: a M-estimation formulation", Proceedings of the 16th International Conference on Artifical Intelligence and Statistics (AISTATS) 2013, vol. 31 of JMLR, 9 pgs.

Conneau et al. "Supervised Learning of Universal Sentence Representations from Natural Language Inference Data", Dated Jul. 21, 2017, 12 pages.

Dai et al., "Semi-supervised Sequence Learning", dated 2015, 9 pages.

Dal Pozzolo et al., "Learned lessons in credit card fraud detection from a practitioner perspective", dated 2014 Elsevier Ltd., 14 pages.

Bontemps et al., "Collective Anomaly Detection based on Long Short Term Memory Recurrent Neural Network", dated Mar. 2017, 13 pages.

Sutskever et al., "Sequence to Sequence Learning with Neural Networks", dated 2014, 9 pages.

Ruder, Sebastian, "An Overview of Gradient Descent Optimization Algorithms", dated Jun. 15, 2017, 14 pages.

Sabokrou et al., "Real-Time Anomaly Detection and Localization in Crowded Scenes", dated 2015, 7 pages.

Sakurada et al., "Anomaly Detection Using Autoencoders with Nonlinear Dimensionality Reduction", MLSDA '14, Dec. 2, 2014, Gold Coast, QLD, Australia Copyright 2014 ACM, 8 pages.

Schubert et al., "On Evaluation of Outlier Rankings and Outlier Scores", dated 2012, 12 pages.

Seleznyov et al., "Anomaly Intrusion Detection Systems: Handling Temporal Relations between Events", dated 1999, 12 pages.

Shen et al., "Scalable Large-Margin Mahalanobis Distance Metric Learning", IEEE, vol. 30, No. 9, dated 2010, 7 pages.

Kolter et al., "Dynamic Weighted Majority: An Ensemble Method for Drifting Concepts", Journal of Machine Learning Research 8, dated 2007, 36 pages.

Singh et al., "Quantitative Evaluation of Normalization Techniques of Matching Scores in Multimodal Biometric Systems", Springer-Verlag Berlin Heidelberg, dated 2007, 10 pages.

Platt, John, "Probabilistic Outputs for Support Vector Machines and Comparisons to Regularized Likelihood Methods", dated Mar. 6, 1999, 11 pages.

Tuor et al., "Deep Learning for Unsupervised Insider Threat Detection in Structured Cybersecurity Data Streams", dated Dec. 15, 2017, 9 pages.

Usama et al., "Unsupervised Machine Learning for Networking: Techniques, Applications and Research Challenges", dated Sep. 19, 2017, 37 pages.

Wang et al.,Towards a Hierarchical Bayesian Model of Multi-View Anomaly Detection, Twenty-Ninth International Joint Conference on Artificial Intelligence, dated Jul. 11, 2020, 7 pages.

(56) References Cited

OTHER PUBLICATIONS

Webb et al., Characterizing Concept Drift, Data Mining and Knowledge Discovery, dated Jul. 2016, 30 pages.
Xiang et al., "Learning a Mahalanobis distance metric for data clustering and classification", Pattern Recognition 41, dated 2008, 13 pages.
Xu et al., "Detecting Large-Scale System Problems by Mining Console Logs", dated 2009, 16 pages.
Yousefi-Azar et al., "Autoencoder-based Feature Learning for Cyber Security Applications", dated 2017, 8 pages.
Shipmon et al., "Time Series Anomaly Detection", Detection of Anomalous Drops with Limited Features and Sparse Examples in Noisy Highly Periodic Data, dated 2017, 9 pages.
Mirza Ali H et al., "Computer Network Intrusion Detection Using Sequwnrial LSTM Neural Networks Autoencoders", dated May 2, 2018, 2018 26th Signal Processing and Communicaitons Applications Con. 4 pgs.
YuanZhong, Zhu, "Intrusion Detection Method based on Improved BP Neural Network Research", International Journal of Security and Its Applications vol. 10, No. 5 (2016) pp. 193-202.
Loganathan et al., "Sequence to Sequence Pattern Learning Algorithm for Real-time Anomaly Detection in Network Traffic", conference paper dated May 2018.
Luo et al., "A Revisit of Sparse Coding Based Anomaly Detection in Stacked RNN Framework", dated Oct. 2017, 9 pages.
Malhotra et al., "Long Short Term Memory Networks for Anomaly Detection in Time Series", ESANN dated Apr. 22, 2015 proceedings, European Symposium on Artificial Neural Networks, 6 pages.
Malhotra et al., "LSTM-based Encoder-Decoder for Multi-sensor Anomaly Detection", Presented at ICML 2016 Anomaly Detection Workshop, New York, NY, USA, 2016. Copyright 2016—5 pages.
Mathuranathan, Q Function and Error functions : Demystified, dated Jul. 16, 2012, https://www.gaussianwaves.com/2012/07/q-function-and-error-functions/, 7 pages.
Mei et al., "Learning a Mahalanobis Distance based Dynamic Time Warping Measure for Multivariate Time Series Classification", IEEE, dated 2015, 12 pages.
Rayana et al., "Sequential Ensemble Learning for Outlier Detection: A Bias-Variance Perspective", dated Sep. 18, 2016, 11 pages.
Mikolov et al., "Efficient Estimation of Word Representations in Vector Space", dated Sep. 7, 2013, 12 pages.
Polonik, Wolfgang, "Measuring Mass Concentrations and Estimating Density Contour Clusters—An Excess Mass Approach", The Annals of Statstics, dated 1995, vol. 23, No. 3, 27 pages.
Mnih et al., "A Scalable Hierarchical Distributed Language Model", dated 2009, 8 pages.
Moustafa et al., "A holistic review of Network Anomaly Detection Systems: A comprehensive survey", Journal of Network and Computer Applications vol. 128, Feb. 15, 2019, pp. 33-55.
N.Krishnavardhan, "A Framework to Identify Cybercrime Using Data Analytics", International Journal of Pure and Applied Mathematics, vol. 120, No. 6 dated Jun. 11, 2018, 14 pages.
Naseer et al., "Enhanced Network Anomaly Detection Based on Deep Neural Networks", Journal of Latex Class Files, vol. 14, No. 8, Aug. 2015, 16 pages.
Nguyen et al., "An Evaluation Method for Unsupervised Anomaly Detection Algorithms", Journal of Computer Science and Cybernetics, V.32, N.3, dated 2016, 14 pages.

Palacio-Nino et al., "Evaluation Metrics for Unsupervised Learning Algorithms", dated May 23, 2019, 9 pages.
Le et al., "Distributed Representations of Sentences and Documents", Proceedings of the 31 st International Conference on Machine Learning, Beijing, China, dated 2014, 9 pages.
Mikolov et al., "Distributed Representations of Words and Phrases and their Compositionality", dated 2013, 9 pages.
Zhou, Junlin, et al., "Unsupervised Learning Based Distributed Detection of Global Anomalies", 2010, International Journal of Information Technology and Decision Making, vol. 2010, Nov. 2010, pp. 1-11.
Vikram, Adiya, et al., "Anomaly detection in Network Traffic Using Unsupervised Machine learning Approach", 2020 5th Intl Conf on Communication and Electronics Systems (ICCES), vol. 5 (2020), pp. 476-479, Jul. 10, 2020, 4pgs.
Angiulli, Fabrizio, "Concentration Free Outlier Detection", 2017, Machine Learning and Knowledge Discovery in Databases, vol. 2017, pp. 3-19.
Neuberg, Richard, et al., "Detective Relative Anomaly", 2015 18th Intl Conf, on Mach Learning and Data Mining in Pattern Recognition, Lecture Notes in Computer Science, LNAI 10358. Springer, doi.org/10.1007/978-3-319-62416-7_9, Jul. 2, 2017, 15pgs.
Gao, Jing, et al., "Converting Output Scores from Outlier Detection Algorithms into Probability Estimates", 6th Intl Conf on Data Mining (ICDM'06), pp. 212-221, doi: 10.1109/ICDM.2006.43, Dec. 18, 2006, 10pgs.
Siffer et al., "Anomaly Detection in Streams with Extreme Value Theory", Proceedings of the 23rd ACM SIGKDD International Conference on Knowledge Discovery and Data Mining, https://hal.archives-ouvertes.fr/hal-01640325, dated Nov. 20, 2017, 10 pages.
Eskin, Eleazar, "Anomaly Detection Over Noisy Data Using Learned Probability Distributions", https://academiccommons.columbia.edu/doi/10.7916/D8C53SKF, dated 2000, 8 pages.
Dykes, Sandra, "Poster: An Extreme Value Theory Approach to Anomaly Detection (EVT-AD)", https://www.ieee-security.org/TC/SP2012/posters/An%20Extreme%20Value%20Theory%20Approach.pdf, dated 2012, 2 pages.
Davis et al., "LSTM-Based Anomaly Detection: Detection Rules from Extreme Value Theory", EPIA Conference on Artificial Intelligenc https://arxiv.org/pdf/1909.06041.pdf, dated Sep. 13, 2019, 12 pages.
Angiulli et al., "Distance-Based Detection and Prediction of Outliers", IEEE Transactions on Knowledge and Data Engineering, vol. 18, No. 2, dated Feb. 2006, 16 pages.
Ross, Gordon J., et al. "Exponentially weighted moving average charts for detecting concept drift", Pattern Recognition Letters 33.2 (Year: 2012).
Siffer et al., "Anomaly Detection in Streams with Extreme Value Theory" KDD Research Paper (2017).
Ross et al., "Exponentially weighted moving average charts for detecting concept drift." Pattern Recognition Letters 33.2 (Year: 2012).
Qian et al., "A Rank-SVM Approach to Anomaly Detection", A New One-Class SVM for Anomaly Detection (Year: 2014).
Jaworski et al., "Concept drift detection using autoencoers in data streams processing". In International Conference on Artificial Intelligence and Soft Computing (Year 2020).

* cited by examiner

FIG. 2

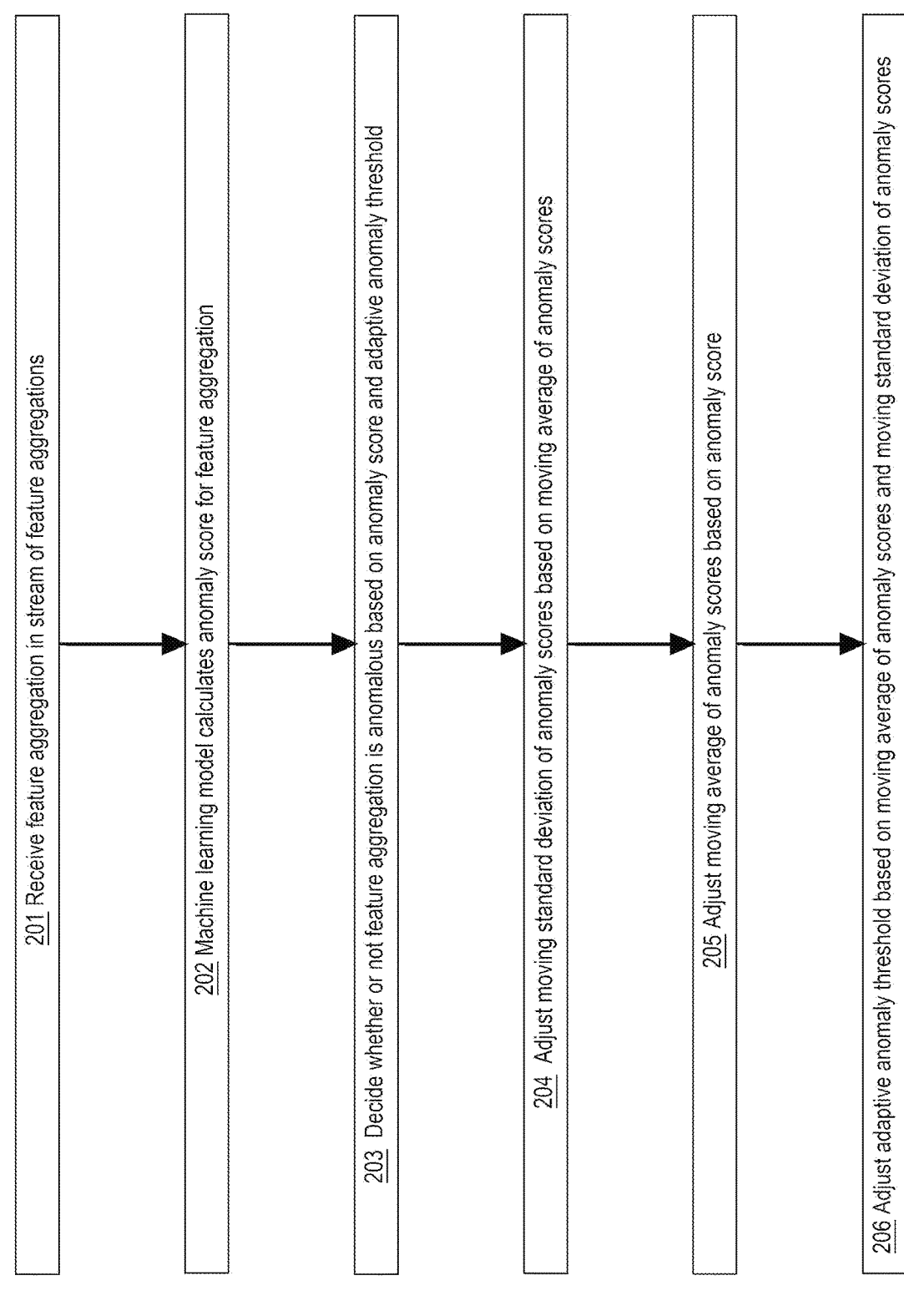

201 Receive feature aggregation in stream of feature aggregations

202 Machine learning model calculates anomaly score for feature aggregation

203 Decide whether or not feature aggregation is anomalous based on anomaly score and adaptive anomaly threshold 204 Adjust moving standard deviation of anomaly scores based on moving average of anomaly scores 205 Adjust moving average of anomaly scores based on anomaly score 206 Adjust adaptive anomaly threshold based on moving average of anomaly scores and moving standard deviation of anomaly scores

FIG. 3

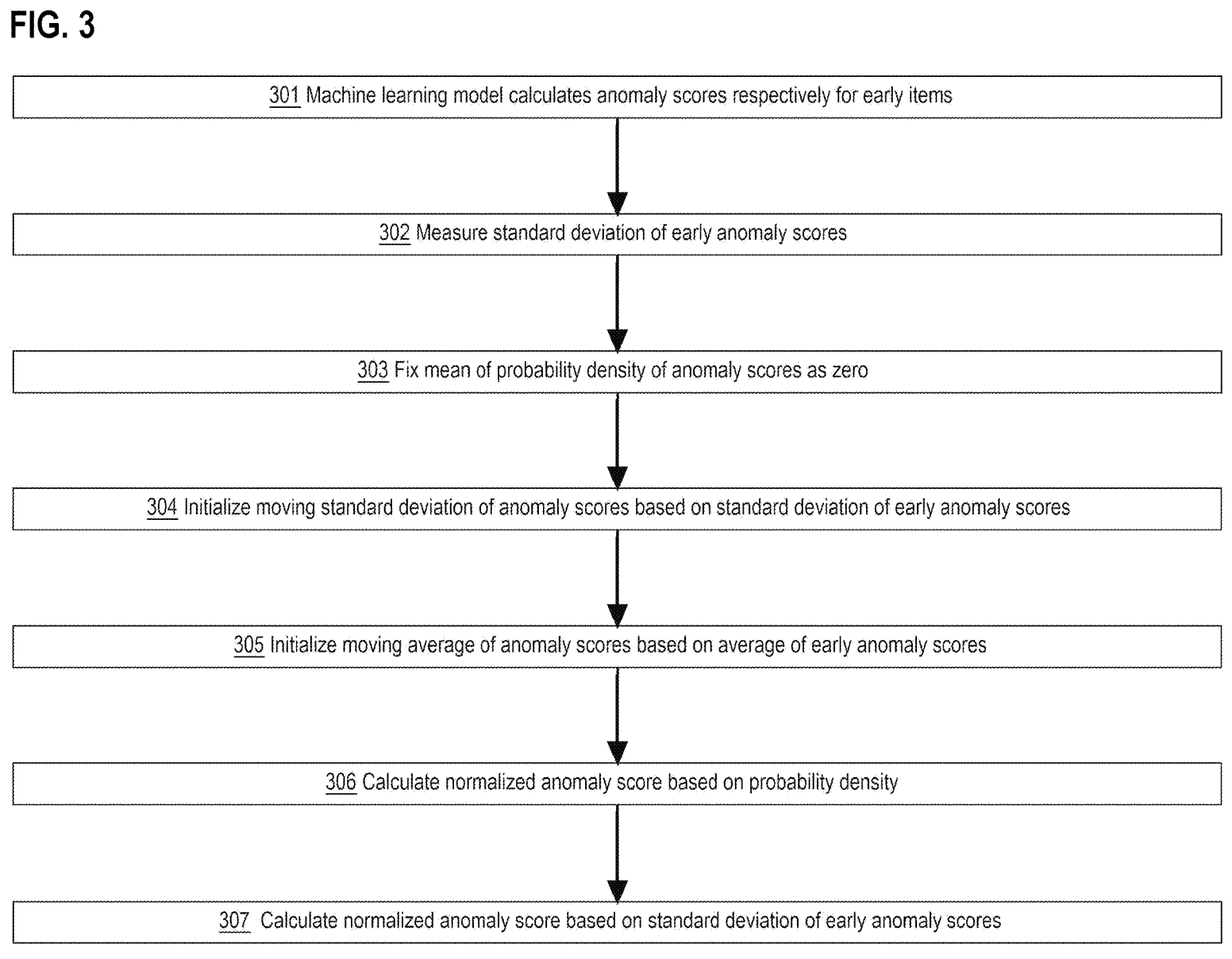

301 Machine learning model calculates anomaly scores respectively for early items 302 Measure standard deviation of early anomaly scores 303 Fix mean of probability density of anomaly scores as zero 304 Initialize moving standard deviation of anomaly scores based on standard deviation of early anomaly scores 305 Initialize moving average of anomaly scores based on average of early anomaly scores 306 Calculate normalized anomaly score based on probability density 307 Calculate normalized anomaly score based on standard deviation of early anomaly scores

FIG. 4

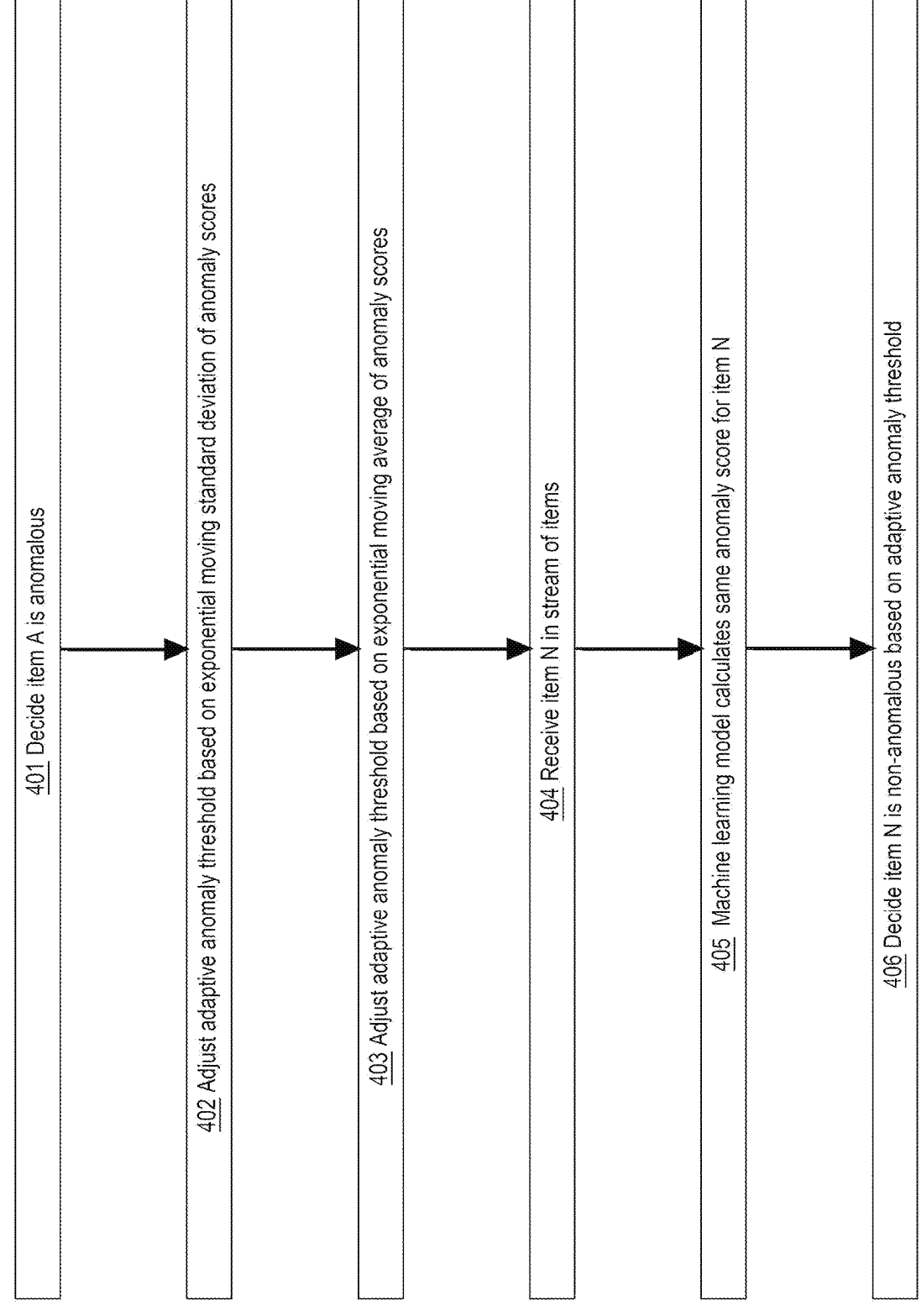

401 Decide item A is anomalous

402 Adjust adaptive anomaly threshold based on exponential moving standard deviation of anomaly scores 403 Adjust adaptive anomaly threshold based on exponential moving average of anomaly scores 404 Receive item N in stream of items 405 Machine learning model calculates same anomaly score for item N 406 Decide item N is non-anomalous based on adaptive anomaly threshold 501 Machine learning model calculates anomaly score for internet of things (IoT) telemetry 502 Detect console log message is anomalous based on adaptive anomaly threshold 503 Detect network intrusion based on adaptive anomaly threshold

SOFTWARE SYSTEM 700

702

702N

702C

702B

702A

APPLICATION PROGRAM 1

APPLICATION PROGRAM 2

APPLICATION PROGRAM 3

[...]

APPLICATION PROGRAM N

OPERATING SYSTEM
(e.g., WINDOWS, UNIX, LINUX, MAC OS, IOS, ANDROID, OR LIKE)

GRAPHICAL USER INTERFACE (GUI)

710

715

VIRTUAL MACHINE MONITOR (VMM)

730

BARE HARDWARE (e.g., COMPUTING DEVICE 600)

AUTOMATICALLY CHANGE ANOMALY DETECTION THRESHOLD BASED ON PROBABILISTIC DISTRIBUTION OF ANOMALY SCORES

FIELD OF THE INVENTION

The present invention relates to model decay of an anomaly detector due to concept drift. Herein are machine learning techniques for dynamically self-tuning an anomaly score threshold.

BACKGROUND

Anomaly detection is an important tool with various use cases in security such as fraud detection and intrusion detection. A powerful approach recently employed in anomaly detection involves machine learning (ML) models such as an artificial neural network such as an autoencoder. Anomaly detection using ML models can be categorized into two groups of existing techniques. In the first group, the entire dataset is used for model training, and the ML model is used to detect anomalies inside that dataset. In the second group, the data is discretized into three parts: training, validation, and test. The ML model is trained on the training dataset and then fine-tuned using the validation dataset. Subsequently the trained and validated model is applied to the test dataset. The test dataset can be a nearly infinite stream of data incoming to the ML model. Although such models can be made somewhat robust to input noise, they cannot handle input data distribution changes, which is a phenomenon called concept drift or data drift.

In one example, concept drift occurs when a series of inputs evolves over time such that later normal inputs have feature values that are no longer within the value range of earlier normal inputs such as training inputs. For example, an ML model may be a classifier that learned to distinguish normal tree seedlings from normal weeds because seedlings are smaller than weeds. However over time, seedlings may grow to be a same size as weeds or grow into trees that are bigger than weeds, which may confuse the classifier. For example, the classifier may mistakenly classify an older seedling as a weed.

Concept drift may have various causes. For example, seasonality may cause a normal temperature range to shift such that a normal temperature may be mistakenly detected as anomalous or an abnormal temperature may be mistakenly detected as non-anomalous. Seasonality may influence consumer preferences which may interfere with a predictive ML model for a supply chain or for behavioral advertisement targeting.

Concept drift naturally happens in many or most real-world systems, where the system is inherently dynamic or dependent on dynamic parameters such as the evolving state of a server machine in time. Such shifts in data are usually inevitable because the system is dynamic and cannot be controlled or predicted in every aspect. Moreover, ML model performance is highly dependent on the distribution of previous data involved during a training phase. After fitting to training data, an ML model may be unable to handle concept drift.

Known anomaly detectors apply a constant threshold to anomaly scores. Any data item with an anomaly score higher than the threshold would be classified as anomalous. A technical problem is that normal characteristics in data eventually change due to concept drift, which reduces inference accuracy and may cause an anomaly threshold to become unreliable. In industry, an existing solution for concept drift is usually to retrain the ML model with new data, in which case, the retrained model learns the new distribution of the data and can do well in detecting anomalies that happen after the concept drift that necessitated retraining.

However, a sufficient amount of data is needed after the concept drift in order to be able to retrain the model, which means, in some applications, several hours or days need to pass to be able to accumulate enough real data from a concept drift before retraining. In addition, retraining an ML model and redeploying it after a concept drift usually takes a significant amount of time. In those ways, retraining may impose a somewhat prolonged service outage of an ML model.

BRIEF DESCRIPTION OF THE DRAWINGS

In the drawings:

FIG. 2 is a flow diagram that depicts an example computer process that continuously tunes an adaptive anomaly threshold to compensate for concept drift that could cause model decay of a machine learning (ML) model;

FIG. 3 is a flow diagram that depicts example computer activities for anomaly scoring and dynamic thresholding;

FIG. 4 is a flow diagram that depicts example computer calculations to adjust an adaptive anomaly threshold;

DETAILED DESCRIPTION

Figure 1:
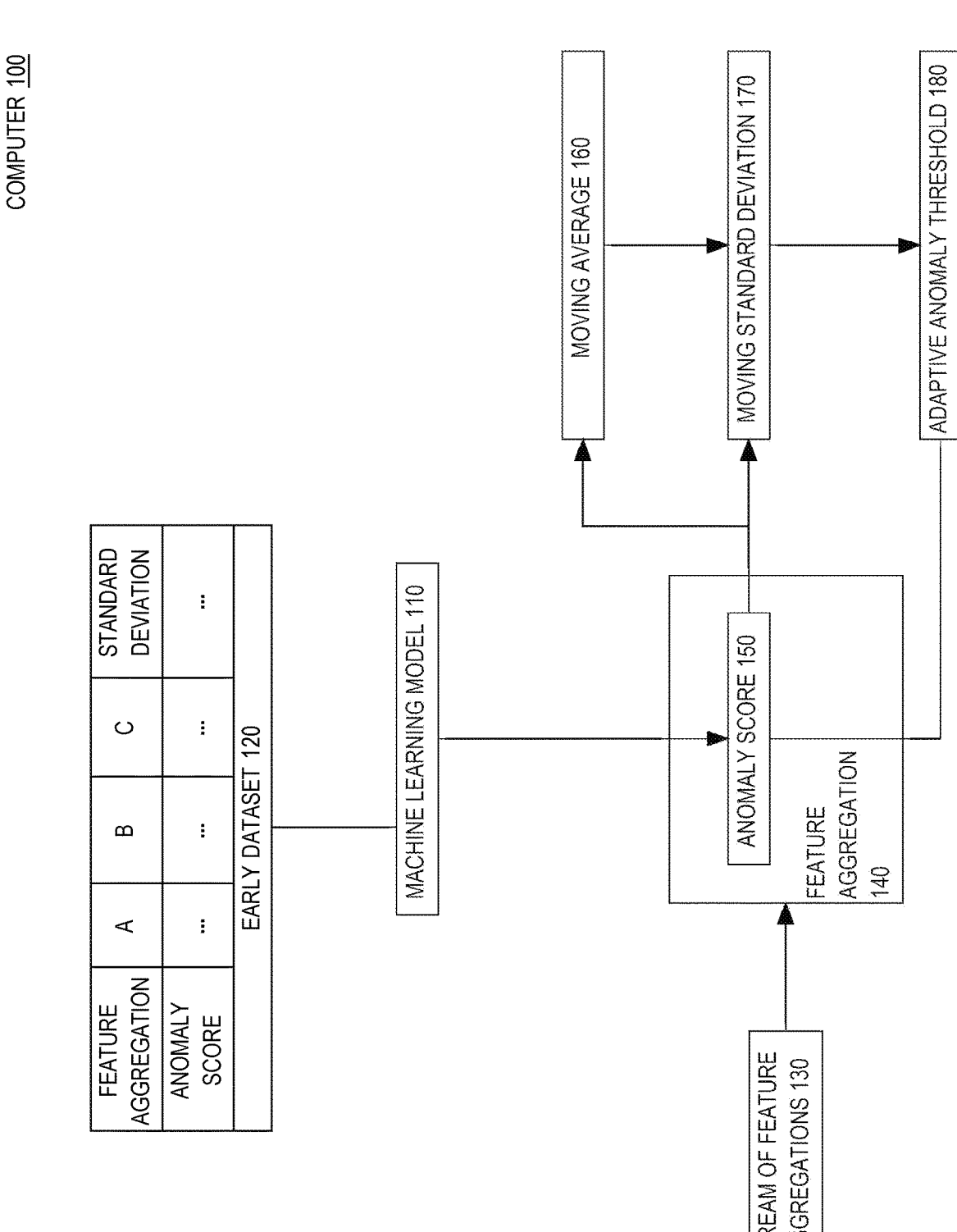
FIG. 1 is a block diagram that depicts an example computer that dynamically tunes an adaptive anomaly threshold to compensate for concept drift that could cause model decay of a machine learning (ML) model.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

The present invention relates to model decay of an anomaly detector due to concept drift. Herein are machine learning techniques for dynamically self-tuning an anomaly score threshold. Herein is a dynamic thresholding approach to preserve an anomaly detector's ability to accurately classify data items even when concept drift causes a distribution of data in a production environment to diverge from training data. A goal is to make the anomaly detector able to adapt to changes in value range and distribution trends of input data. Herein is anomaly score normalization and dynamic thresholding that are proven to be effective in detecting and automatically handling concept drifts in data of various applications such as structured log data of cloud servers.

Compared to other industry solutions, approaches herein allow a machine learning (ML) anomaly detector to continue to perform well for longer periods of time and with no need to be retrained on recent data. Techniques herein are computationally inexpensive and can be done in streaming mode with no need to have all data stored in memory, which may be infeasible for large-scale data.

Unlike other techniques, dynamic thresholding entails a probabilistic approach that normalizes anomaly scores and rescales them to a range [0,1], where 0 indicates a certainly normal item and 1 indicates a certain anomaly. Then, a dynamic threshold based on statistical measures of the normalized anomaly scores is applied. As concept drift happens over time, the system automatically raises the threshold based on distribution of anomaly scores. This lowers a false positive rate and makes the system more resilient.

Herein are statistical moving parameters for monitoring the behavior of data inputs. Statistical moving parameters can follow the distribution of anomaly scores generated by an anomaly detection model. These parameters give important information about trends and behavior of the anomaly scores over time and thus can be used to dynamically adjust an anomaly threshold.

Statistical moving parameters herein are computationally efficient and therefore are suitable for large scale problems and/or embedded deployments that may have high data rates, low computational resource availability, and/or low latency deadlines such as for live real-time stream processing. These moving statistics are robust in dealing with abrupt changes in the input data stemming from the natural distribution of data compared to gradual changes from concept drift as explained herein. That is, these measurements can distinguish trends versus spikes.

A computer may operate measurements and calculations herein in a live environment with a high-speed input stream of inputs such as telemetry without incurring additional latency nor consuming excessive computational resources such that processing overhead for metrics does not interfere with an ML model that provides low-latency inferences in real time. Techniques herein can be used in an automated fashion without any need for manual intervention. Characteristics and trends of a dynamic anomaly threshold can quantify intensities of concept drifts and inform when retraining is needed. In these ways, dynamic thresholding may also be an important health monitoring activity for system administration.

Applicability of a dynamic anomaly threshold is broad and spans various data-intensive industries, machine learning purposes, and machine learning architectures. This approach can be used for security and operational health monitoring for datacenters and software through log analytics, intrusion detection, and pattern analysis. Enterprise and cloud servers can derive advantage from this approach. In addition, log data analysis has numerous applications in fault detection or security monitoring for internet of things (IoT). Techniques herein can be used for fraud detection in credit card processing and other financial technology (FinTech) security applications.

Some embodiments are especially useful for anomaly detection of log data. Input log data can change suddenly or gradually over time. When this happens, dynamic thresholding allows a system to continue detecting only the most suspicious anomalous activities. That helps keep cloud server machines safe from malfunctions and internal and external attacks.

Anomalous log messages are a very small fraction of input data (typically under 0.01%), whereas concept drifts can be large scale changes in the data. That is one of the reasons that dynamic thresholding approach is effective. Depending on the flow of the input log data, the dynamic threshold might increase for a brief period of time and then decrease. That usually indicates a temporary change in input log data such as caused by a software update. With approaches herein, the system can keep operating properly with no need of retraining the ML model. That saves operating costs and computer resources because retraining the ML model is an expensive operation and is intensive of computational resources.

On the other hand, when the dynamic threshold increases without soon decreasing, that indicates that a long-lived concept drift happened, and retraining the ML model is beneficial or necessary. Retraining the ML model might take weeks. Automatically raising the dynamic threshold allows the system to remain in service and properly working in a production environment while the ML model is being retrained such as offline such as in another environment such as a laboratory. Herein, dynamic threshold and adaptive anomaly threshold are synonymous.

In an embodiment in a production environment, a computer receives an item in a stream of items. An ML model hosted by the computer infers by calculation an anomaly score for the item. Whether the item is anomalous or not is decided based on the anomaly score and an adaptive anomaly threshold that dynamically fluctuates. A moving standard deviation of anomaly scores is adjusted based on a moving average of anomaly scores. The moving average of anomaly scores is then adjusted based on the anomaly score. The adaptive anomaly threshold is then adjusted based on the moving average of anomaly scores and the moving standard deviation of anomaly scores.

1.0 Example Computer

FIG. 1 is a block diagram that depicts an example computer 100, in an embodiment. Concept drift may cause model decay of machine learning (ML) model 110 that computer 100 compensates for by dynamically tuning adaptive anomaly threshold 180. Computer 100 may be one or more of a rack server such as a blade, a personal computer, a mainframe, a virtual computer, a smartphone, or other computing device.

In memory, computer 100 stores already-trained ML model 110 that is an anomaly detector, such as an autoencoder as discussed later herein. ML model 110 processes a complex input, such as feature aggregation A-C or 140, to generate an inference that is an anomaly score such as 150.

ML model 110's lifecycle has two phases, which are laboratory training followed by production inferencing. Learning occurs during training that may entail internal adjustment of ML model 110 based on measured error of model inferences as discussed later herein.

1.1 Autoencoder

In an embodiment, ML model 110 is an autoencoder. Backpropagation training of an artificial neural network (ANN) such as an autoencoder as discussed later herein may be driven by model error. With supervised training, model error may be measured by comparing an inference by an ML model to a predefined label that is already established as the correct inference. With unsupervised training, such as with an autoencoder, predefined labels may be unavailable, and error may instead be measured based on diagnostic output from the autoencoder as follows.

In an embodiment, an autoencoder may be a multilayer perceptron (MLP) that generally provides dimensionality reduction, regardless of whether the autoencoder is used for classification or anomaly detection. As discussed above, classification entails associating an inferred label with a complex input. In other words, classification entails recognizing a learned pattern. Anomaly detection does the opposite, which is recognizing that an input does not match any learned pattern.

In any case, an autoencoder provides dimensionality reduction, which: a) entails avoiding analysis and integration of irrelevant features of an input, and b) generating a more concise internal neural representation of the input in which only meaningful input features are retained. In other words, an autoencoder extracts semantic details of a complex, noisy, and fuzzy input. Thus, the autoencoder converts a sparse representation of an input into a dense encoding. Features and feature representation are discussed later herein.

In an embodiment, ML model 110 instead is a principal component analysis (PCA). Although operationally very different from an autoencoder, PCA is an ML model that is functionally similar to an autoencoder as follows. Like an autoencoder, PCA undergoes unsupervised training to learn dimensionality reduction and minimize inference error. Architectures of PCA and autoencoders are discussed later herein.

1.2 Production Inferencing

As mentioned above, training is not the only lifecycle phase of an ML model, and learning is not the only use of anomaly scoring. The two lifecycle phases of laboratory training and production inferencing are rigid such that all machine learning occurs in the training environment, and no learning occurs in the production environment. That dichotomy may present technical problems as follows.

As explained above, anomaly detection entails recognizing that a feature aggregation such as a complex item matches no learned pattern. In other words, anomaly detection entails recognizing unfamiliarity, which has the following implications. A feature aggregation is a set of features that represent an object or that are contained in an object. Depending on the embodiment, a feature aggregation may be an item, data item, record, sample, data structure, or other container or source of features that describe a same object. Examples of a feature aggregation include a message, a network packet, an individual log entry, and a trace consisting of related log entries. A feature aggregation may be stored in various formats such as a line of text, a feature vector, a database record, or a self-describing document such as JavaScript object notation (JSON) or extensible markup language (XML).

Accurate anomaly scoring is eventually achieved during training. Without training, accurate anomaly scoring is impossible. By definition, an unfamiliar feature aggregation is any feature aggregation that ML model 110 was not trained for. An unfamiliar feature aggregation in a production environment causes ML model 110 to generate an anomaly score that exceeds adaptive anomaly threshold 180, which indicates that the feature aggregation is anomalous. However even in a production environment, anomalies are not the only possible cause of excessive anomaly scores.

1.3 Concept Drift

In a production environment, drift also causes excessive anomaly scores such as concept drift, a.k.a. data drift. In one example, concept drift occurs when a series of feature aggregations from stream of feature aggregations 130 evolves over time such that later normal feature aggregations have feature values that are no longer within the value range of earlier normal feature aggregations such as training feature aggregations A-C in early dataset 120 as discussed later herein.

Concept drift may have various causes. For example, seasonality may cause a normal temperature range to shift such that a normal temperature may be mistakenly detected as anomalous or an abnormal temperature may be mistakenly detected as non-anomalous. Seasonality may influence consumer preferences which may interfere with a predictive ML model for a supply chain or for behavioral advertisement targeting.

Concept drift may occur in technical environments such as internet of things (IoT) telemetry or enterprise operations monitoring. For example, as operational trends cause a datacenter's inventory to grow or cause operations to span additional datacenters, various evolutionary changes may occur. For example, contents and patterns of network traffic may evolve, and contents of console logs may evolve. Even a disturbance as innocuous as a software application upgrade or patch may cause such contents and patterns to shift. Thus, natural indications of operations as normal or anomalous may have different value ranges at different times such as according to various gradual trends or sudden planned changes such as according to capacity planning.

Concept drift causes inference error that, in known approaches, an anomaly detector such as an autoencoder will be unable to distinguish from an actual anomaly such as an accidental outage or a malicious intrusion. In other words and according to known approaches, concept drift causes an anomaly detector to raise a false alarm. If that anomaly detector repeatedly or continuously raises false alarms, the anomaly detector may become more or less useless for two reasons. First, system administrators waste much time with manual forensics and diagnostics to decide whether an alarm is correct or not. Second, system administrators learn to ignore the malfunctioning anomaly detector such that a true alarm for a real problem goes unnoticed.

Such malfunctioning due to concept drift is known as model decay. Computer 100 compensates for concept drift by dynamically recalibrating adaptive anomaly threshold 180. As explained later herein, such recalibration is based on extended trends, and not sudden spikes, to anomaly scores generated by ML model 110. In that way, recalibration distinguishes between true anomalies versus false anomalies caused by concept drift.

In an embodiment, ML model 110 processes feature aggregations, one at a time, from stream of feature aggregations 130. The anomaly score of each feature aggregation may cause a respective adjustment to fluctuating statistics that computer 100 maintains such as moving average 160 of anomaly scores and moving standard deviation 170 of anomaly scores as discussed later herein. Because adaptive anomaly threshold 180 is based on moving statistics 160 and 170 that may be adjusted with each feature aggregation, adaptive anomaly threshold 180 may also be adjusted when ML model 110 processes each feature aggregation.

1.4 Statistical Metrics

Computer 100 measures and uses fluctuating metrics such as moving statistics 160 and 170, and adaptive anomaly threshold 180 to monitor and interpret the behavior of ML model 110 as discussed later herein. By operating those fluctuating metrics, computer 100 can: distinguish a true anomaly from concept drift, and detect when model decay due to concept drift is so problematic that escalation is needed such as to alert a system administrator and/or initiate retraining of ML model 110.

Computer 100 may operate those fluctuating metrics in a live environment with high-speed input stream of feature aggregations 130 such as telemetry without incurring additional latency nor consuming excessive computational resources such that processing overhead for those metrics does not interfere with ML model 110 that provides low-latency inferences in real time.

1.5 Anomaly Detection

By definition, an anomalous feature aggregation is unlike other feature aggregations. Whether a current feature aggregation is by itself anomalous depends only on the anomaly score of the current feature aggregation. According to approaches herein and unlike anomaly detection, concept drift extends beyond any one feature aggregation to affect many or most feature aggregations, which may render useless other anomaly detection techniques as discussed earlier herein. Techniques herein detect that anomaly scores are abnormal in too many of a sequence of feature aggregations as follows.

Although anomaly detection and concept drift compensation are both based on anomaly scoring, observable differences are as follows. Anomaly detection alerts a sudden spike in anomaly scoring. Concept drift is gradual instead of sudden. Concept drift compensation is based on past as well as current anomaly scores as follows.

Computer 100 uses moving statistics 160 and 170 as follows. Moving statistics may serve two purposes. First, moving statistics 160 and 170 provide smoothing such that a sudden spike in anomaly scoring should not by itself cause a reaction for concept drift compensation as the spike should for anomaly detection. That is, moving statistics 160 and 170 facilitate automatically distinguishing an anomalous feature aggregation from concept drift.

Second, because concept drift is a sustained phenomenon and not fleeting, moving statistics 160 and 170 can indicate a trend in stream of feature aggregations 130 such as a value range shift such as from data drift. Various embodiments may implement moving statistics calculations of varied complexity such as exponential moving average as discussed later herein.

1.6 Operating in Production

Regardless of how moving statistics 160 and 170 are calculated, by one exponential formula or another or with a moving formula that is not exponential, in any case, computer 100 individually processes current feature aggregation 140 to calculate and classify anomaly score 150. While processing the current feature aggregation, anomaly score 150 is used to adjust moving statistics 160 and 170 that, as discussed later herein, are terms for formulaic calculation of adaptive anomaly threshold 180 that is recalculated for each feature aggregation in stream of feature aggregations 130. Thus, anomaly scores drive various continuous calculations upon which adaptive anomaly threshold 180 is based such as discussed later herein.

Herein, adaptive anomaly threshold 180 is a passive metric that does not alter internal behavior of ML model 110. However, computer 100 may detect when anomaly score 150 exceeds adaptive anomaly threshold 180 and react in various ways. That is, reaction, mistaken reaction, and/or overreaction to anomaly score 150 occurs downstream of model operation in a dataflow for current feature aggregation 140.

Such downstream reaction to anomaly score 150 may be dampened or heightened by adaptive anomaly threshold 180, which may have dual purposes as follows and discussed later herein. In an embodiment, adaptive anomaly threshold 180 may facilitate preventing abnormally trending feature(s)

of feature aggregations in stream of feature aggregations 130 from causing a false alarm for a mistakenly supposed anomaly. In an embodiment, adaptive anomaly threshold 180 may provide sufficient compensation for concept drift to decrease or eliminate the impact of model decay, which may eliminate or defer a need to retrain or replace ML model 110. In other words, adaptive anomaly threshold 180 may extend the useful service life of ML model 110 in production without interruption.

Early dataset 120 is a collection of feature aggregations A-C for which ML model 110 generates respective anomaly scores that are shown as ellipses although actually numbers. Generation and use of anomaly scores of early dataset 120 occur at special times that may be online or offline as discussed later herein. As a population, the anomaly scores for early dataset 120 may have a standard deviation that is also shown as an ellipsis although actually a number. A detailed explanation of early dataset 120 and its shown contents is part of discussion of FIG. 3 later herein.

2.0 Anomaly Threshold Adaptation Process

FIG. 2 is a flow diagram that depicts an example process that computer 100 may perform to continuously tune adaptive anomaly threshold 180 to compensate for concept drift that could cause model decay of machine learning (ML) model 110. FIG. 2 is discussed with reference to FIG. 1.

The process of FIG. 2 is sequentially repeated for each feature aggregation in stream of feature aggregations 130 as follows. Step 201 receives current feature aggregation 140 as a next feature aggregation in stream of feature aggregations 130. In various embodiments, stream of feature aggregations 130 is a steady or sporadic stream, a batch of feature aggregations, a series of batches, or a bulk store of feature aggregations such as in a file or database.

In step 202, ML model 110 infers, by calculation, anomaly score 150 for feature aggregation 140. For example if ML model 110 is an artificial neural network (ANN), inferencing entails feed-forward neural processing. As discussed later herein, anomaly score 150 may or may not be normalized to particular numeric units and/or into a particular range.

Step 203 decides whether or not feature aggregation 140 is anomalous by detecting whether or not anomaly score 150 exceeds adaptive anomaly threshold 180, which indicates an anomaly. Various automatic reactions may occur when feature aggregation 140 is anomalous such as logging a warning, raising an alert, diverting or storing feature aggregation 140 for additional inspection, and/or rejecting feature aggregation 140 as unacceptable. Various other automatic reactions may occur when feature aggregation 140 is non-anomalous such as accepting feature aggregation 140 for ordinary further processing in a workflow that is downstream of ML model 110.

Regardless of whether or not feature aggregation 140 is anomalous, steps 204-206 sequentially occur as follows. Step 204 adjusts moving standard deviation 170 of anomaly scores based on moving average 160 of anomaly scores. Mathematics of adjusting moving standard deviation 170 are presented later herein. For example, moving average 160 may or may not be the only numeric term that can affect moving standard deviation 170.

Step 205 adjusts moving average 160 of anomaly scores based on anomaly score 150. In other words, step 205 may cause moving average 160 to have a different value than moving average 160 provided in step 204. Mathematics of adjusting moving average 160, such as exponential moving average, are discussed later herein.

Step 206 adjusts adaptive anomaly threshold 180 based on moving average 160 of anomaly scores and moving standard deviation 170 of anomaly scores. In other words, adaptive anomaly threshold 180 is based on a trend of anomaly scores and a volatility of anomaly scores, which may be somewhat orthogonal numeric terms. For example, moving average 160 may increase while moving standard deviation 170 decreases, or vice versa, or moving statistics 160 and 170 may move together in a same direction.

In an embodiment, adaptive anomaly threshold 180 is limited to a range of a predefined minimum anomaly threshold and maximum anomaly threshold as discussed later herein. In any case, mathematics of adjusting adaptive anomaly threshold 180 are discussed later herein. After step 206, the process of FIG. 2 may repeat with a subsequent feature aggregation from stream of feature aggregations 130 and may continue to repeat indefinitely, until stream of feature aggregations 130 is empty, or until a stopping criteria of an embodiment is satisfied.

3.0 Example Calibration Activities

FIG. 3 is a flow diagram that depicts example activities that a computer, such as an implementation of computer 100, may perform with regard to anomaly scoring and dynamic thresholding. In the following discussions, item and feature aggregation are synonymous.

The process of FIG. 3 occurs in three phases that include early, launch, and detection, which may or may not occur on separate computers and/or in separate environments. The early phase includes step 301 in which the ML model infers raw anomaly scores respectively for early items to provide calibration as needed for steps 302-303. For example, the early items may be items A-C in early dataset 120 of FIG. 1. The nature of the early phase and early items depends on three mutually exclusive embodiments of the early phase as follows.

In a first embodiment, step 301 occurs while training the ML model, and the early items are some or all items in a training corpus. For example because model accuracy improves during training and is higher later in training, the early items may be the last training items used. That is, accuracy late in training should forecast accuracy in production.

In a second embodiment, step 301 instead occurs while validating the ML model, and the early items are all validation items. Validation entails exercising the ML model with fewer items than during training but enough items to detect how the ML model reacts to various representative items. Validation occurs between training and deployment into production. Because learning occurs only during training that finishes before validation, production and validation should have similar accuracy.

In a third embodiment, step 301 instead occurs at the beginning of production operation, and first items from the input stream are the early items. In this embodiment, the moving average of anomaly scores and the standard deviation of anomaly scores are uninitialized, unaffected, and unused while step 301 processes all early items. In this embodiment, the adaptive anomaly threshold is used but is not adjusted and may be initialized to a default value such as a minimum threshold value that is not the same as a minimum anomaly score but instead more similar to a maximum anomaly score.

The launch phase includes steps 302-305 and occurs at or near the beginning of production operation, but not until step 301 finishes. The launch phase uses the early anomaly scores from step 301 to perform calibration as follows.

Techniques herein are robust to support various value ranges of raw anomaly scores that may include negative and positive values and/or unnormalized values. Compensation for such diversity of values is as follows. Whether negative or positive, a raw anomaly score may be arithmetically squared to ensure a positive value in an embodiment.

Thus in an embodiment, while raw anomaly scores may have negative and positive values, the squared anomaly score instead isolates the magnitude of the anomaly score as an absolute value. A squared anomaly score may be used as follows.

Squaring for absolute value is not the only way to constrain a value range of anomaly scores. Value normalization herein is statistically based on a population of anomaly scores for multiple items. A central tendency is measured as one standard deviation based on unnormalized anomaly scores for all of the early items of step 301, which may be measured by step 302 according to a known formula. Depending on the embodiment, standard deviation calculated with unnormalized early anomaly scores from step 301 are stored and/or transferred for use in the launch phase that is discussed later herein. Mathematics of anomaly score normalization based on standard deviation are presented later herein.

As discussed below, anomaly score normalization may be based on Gaussian probability to provide rescaling into probability units instead of natural or raw units. Step 303 fixes the mean of a Gaussian probability density for normalized anomaly scores to zero.

Early anomaly scores and subsequent anomaly score that are not early are normalized in a same way as discussed later herein. Although not shown, normalization of early anomaly score occurs between steps 303-304 in the same way as steps 306-307 that normalize subsequent anomaly scores that are not early. Thus as follows, steps 304-305 entail early anomaly scores that are already normalized.

Step 304 initializes the moving standard deviation of anomaly scores to be the same as the standard deviation of the early anomaly scores. After such initialization, the moving standard deviation may fluctuate as discussed earlier herein. Mathematics of adjusting the moving standard deviation are presented later herein.

Step 305 initializes the moving average of anomaly scores to be the same as the average of the early anomaly scores. After such initialization, the moving average may fluctuate as discussed earlier herein. Mathematics of adjusting the moving average are presented later herein.

The detection phase entails ordinary operation in production, including steps 306-307 that provide numeric terms and mathematical adjustments for normalizing a raw anomaly score. For an item, there is only one normalized anomaly score, even though multiple steps 306-307 may contribute to the normalization in different ways. For example, steps 306-307 may represent different portions of a same anomaly score normalization formula.

Step 306 calculates the normalized anomaly score based on the probability density discussed above for step 303. An advantage of probability normalization is that the normalized anomaly score occurs within a mathematically convenient range from zero to one to provide an actual probability of an anomaly. One indicates a certain anomaly, and zero indicates a certain non-anomaly.

In an embodiment, the normalized anomaly score is provided by the following probability density formula.

$$1 - 2 * Q((\text{score} - \text{mean})/std)$$

The above probability density formula includes the following terms:

score is the raw anomaly score mean is a constant that is zero as explained earlier herein for step 303 std is one standard deviation of the early items as explained earlier herein for step 302

Q( ) is the known Q function that provides a tail distribution of a standard normal Gaussian probability Step 307 is incorporated into the above probability density formula as follows. Step 307 calculates the normalized anomaly score based on the standard deviation of the early anomaly scores, which is used as a denominator in the above probability density formula.

In an embodiment not shown, after step 307 there is an additional normalization step that entails logarithmic rescaling by applying the following rescaling formula to the normalized anomaly score.

$$(-0.1) * \log(10^{-10} + 1 - \text{probability})$$

The above rescaling formula is based on the following numeric terms.

$10^{-10}$ is nearly zero for arithmetic stability probability is the normalized anomaly score before logarithmic rescaling log ( ) is base ten logarithm With the above rescaling formula, normalized anomaly score extremes of zero and one would be approximately unchanged by rescaling. Whereas other normalized anomaly scores rescale as follows: 0.9 rescales to approximately 0.1, 0.99 to 0.2, 0.999 to 0.3, and so on. That logarithmic scale facilitates arithmetic stability and sensitivity of the adaptive anomaly threshold formula (as discussed later herein for steps 402-403 of FIG. 4) as well as visualization of anomalous data points.

After the raw anomaly score is normalized by steps 306-307 and possibly logarithmically rescaled, the normalized/rescaled anomaly score may be used in various ways such as steps 203 and 205 in FIG. 2 or as discussed later herein.

4.0 Calculations for Adaptive Anomaly Threshold

FIG. 4 is a flow diagram that depicts example calculations that a computer, such as an implementation of computer 100, may perform to adjust the adaptive anomaly threshold. FIG. 4 also depicts an example paradoxical scenario where two items A and N are coincidentally assigned a same anomaly score but, due to the adaptive anomaly threshold fluctuating such as due to concept drift, only item A is detected as anomalous. For example, a freezing day may be anomalous in the summer but, due to concept drift, a similarly freezing day in the winter may not be anomalous. Other techniques may erroneously and identically classify both freezing days.

Item A is abnormal. Step 401 decides that item A is anomalous because the anomaly score of item A exceeds the adaptive anomaly threshold. However, the adaptive anomaly threshold may fluctuate in response to anomaly scoring of item A and/or subsequent items. Such fluctuation may be caused by steps 402-403 as follows.

Steps 402-403 provide numeric terms for mathematically adjusting the adaptive anomaly threshold. For an item, there is only one adjustment of the adaptive anomaly threshold, even though multiple steps 402-403 may contribute to the adjustment in different ways. For example, steps 402-403 may represent different portions of a same adaptive anomaly threshold formula.

An embodiment may use the following adaptive anomaly threshold formula.

$$\mu_t + K * \sigma_t$$

The above adaptive anomaly threshold formula is based on the following numeric terms.

$\mu_t$ is the moving average of anomaly scores after adjustment based on the current normalized anomaly score as explained later herein $\sigma_t$ is the moving standard deviation of anomaly scores after adjustment based on the current normalized anomaly score as explained later herein K is a sensitivity constant that is determined experimentally (e.g. K=3) such that increasing K amplifies volatility and decreasing K instead provides smoothing Step 402 adjusts the adaptive anomaly threshold based on an exponential moving standard deviation of anomaly scores that is $\sigma_t$ in the above adaptive anomaly threshold formula. Mathematics of adjusting the exponential moving standard deviation are presented later herein.

Step 403 adjusts the adaptive anomaly threshold based on an exponential moving average of anomaly scores that is $\mu_t$ in the above adaptive anomaly threshold formula. Mathematics of adjusting the exponential moving average are presented later herein.

Steps 402-403 occur for item A and are respectively repeated for each item in the stream of items inferenced after item A. However, steps 404-406 occur before steps 402-403 occur for item N. Item N is normal.

Step 404 receives item N in the stream of items. That is, item N becomes the current item. Here, receives means that item N is taken for inferencing from the stream of items. For example if the stream of items is buffered upstream of the ML model, step 404 occurs when item N is taken from the buffer for inferencing rather than when item N previously was stored into the buffer.

In step 405, the ML model coincidentally infers by calculation a same anomaly score for item N as was earlier inferred for item A. Despite having a same anomaly score, items A and N may or may not be identical. Other approaches use a static anomaly threshold such that items that have a same anomaly score are identically classified. For example with other approaches, item N would be detected as anomalous because item A was detected as anomalous with the same anomaly score.

Whereas the adaptive anomaly threshold fluctuates such that a same anomaly score may cause different items to be differently classified at different times. For example, steps 402-403 may have increased (or decreased) the adaptive anomaly threshold. In that case, step 406 decides that item N is non-anomalous based on the increased adaptive anomaly threshold even though item A was previously detected as anomalous with a same score that is now detected as non-anomalous. Thus, anomaly detection is adaptive and can compensate for concept drift because the anomaly threshold is itself adaptive.

4.1 Moving Average Calculation

As discussed above, the moving average of anomaly scores is used to adjust the adaptive anomaly threshold. A moving average is a so-called rolling calculation of varied robustness in various embodiments as follows. A straightforward implementation of a moving average may be based on an accumulator for summation and a counter, which is risky because the accumulator may eventually overflow. In a safer but less efficient embodiment, a moving average is calculated from a limited fixed amount of most recent items such as a sliding window of a hundred most recent items.

Exponential moving average is a calculation that is safe and efficient with various arithmetic embodiments. In one embodiment, a counter tallies how many items were processed so far, and a delta measures an arithmetic difference of a previous moving average less an anomaly score of a current item. The delta is then scaled down according to a progressively diminishing weight such as 2/counter. That weighted delta is then added to the previous moving average to derive the next moving average.

Various embodiments have various formulae for calculating an exponential moving average. In a most efficient embodiment that lacks a counter, an exponential moving average may instead be calculated according to the following exponential moving average formula.

$$\mu_t = \mu_{t-1}(1-\alpha) + x_t\alpha$$

The above exponential moving average formula is based on the following numeric terms.

$x_t$ is the normalized anomaly score of the current item $\mu_{t-1}$ is the moving average of anomaly scores before adjustment based on the current normalized anomaly score $\alpha$ is a sensitivity constant that indicates how important or unimportant are past anomaly scores such that increasing $\alpha$ to almost one maximizes apparent volatility and decreasing $\alpha$ to almost zero instead maximizes smoothing 4.2 Moving Standard Deviation Calculation As discussed above, the moving standard deviation of anomaly scores is used to adjust the adaptive anomaly threshold. Various numeric terms may contribute to adjusting the moving standard deviation such as follows. In an embodiment, a difference is measured between the normalized anomaly score of the current item and the moving average of anomaly scores before the moving average is adjusted based on the current item. In an embodiment, that difference is measured by the following delta formula.

$$\delta_t = x_t - \mu_{t-1}$$

The above delta formula is based on the following numeric terms.

$x_t$ is the normalized anomaly score of the current item $\mu_{t-1}$ is the moving average of anomaly scores before adjustment based on the current normalized anomaly score In an embodiment, the moving standard deviation of anomaly scores is adjusted based on the difference measured by the above delta formula. In an embodiment, the adjusted moving standard deviation of anomaly scores is calculated according to the following exponential moving standard deviation formula.

$$\sigma_t = \sqrt{(1-\beta)(\sigma_{t-1}^2 + \beta\delta_t^2)}$$

The above exponential moving standard deviation formula is based on the following numeric terms.

Figure 5:
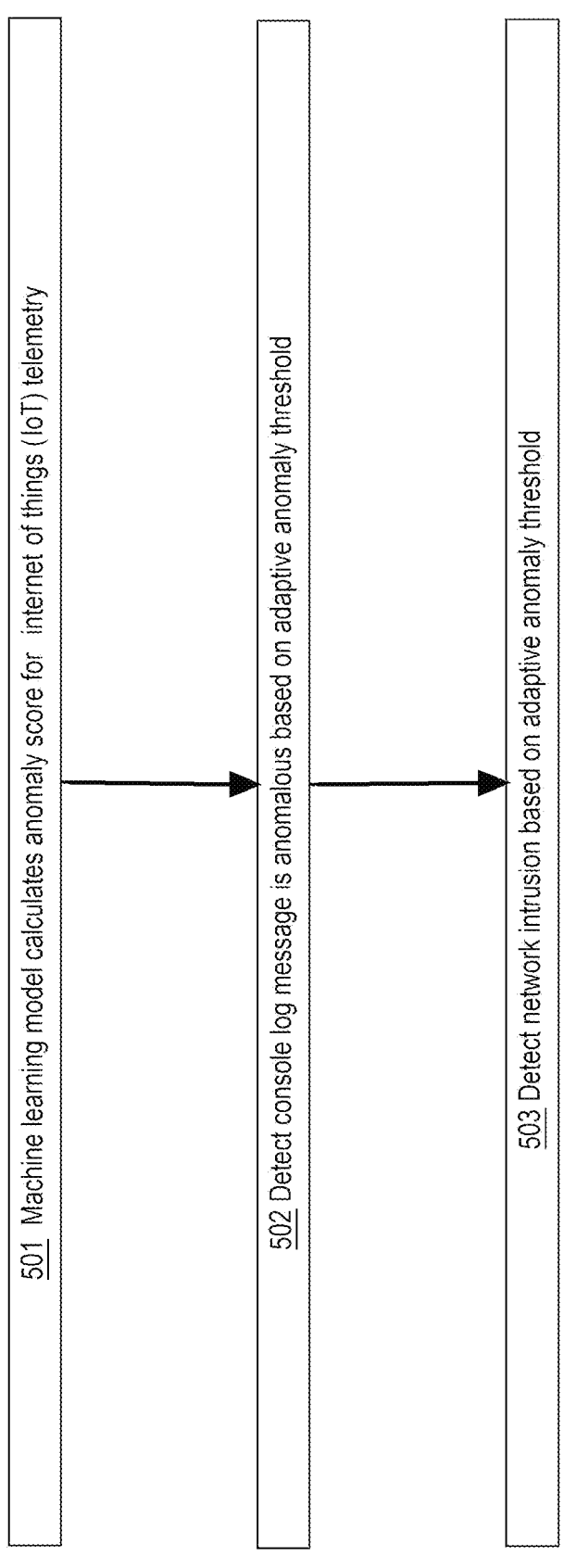
FIG. 5 is a flow diagram that depicts example computer activities to handle an item in an application-specific way.

$\delta_t$ is the difference measured by the above delta formula, which is arithmetically squared in the above formula $\sigma_{t-1}$ is the moving standard deviation of anomaly scores before adjustment based on the current normalized anomaly score, which is arithmetically squared in the above formula $\beta$ is a sensitivity constant that indicates how important or unimportant are past anomaly scores such that increasing $\beta$ to almost one maximizes apparent volatility and decreasing $\beta$ to almost zero instead maximizes smoothing 5.0 Example Applications FIG. 5 is a flow diagram that depicts example activities that a computer, such as an implementation of computer 100, may perform to handle an item in an application-specific way.

The detection phase entails ordinary operation in production that, in various embodiments, entails one, some, or all of steps 501-503 that process a current item from a stream of items as follows. When some or all of steps 501-503 represent a same application, some or all of steps 501-503 may cooperate or be combined. When steps 501-503 represent different applications, steps 501-503 are mutually exclusive such that only one of steps 501-503 is implemented.

In step 501, the ML model calculates an anomaly score for an internet of things (IoT) telemetry item. For example, the stream of items that provides input for the ML model may contain items such as measurement records or operation log entries from remote devices such as sensors. For example, the anomaly score may reflect that a remote device may be hijacked, spoofed, or malfunctioning.

Step 502 detects that a console log message is an anomalous item based on the adaptive anomaly threshold. For example, at least one server, IoT device, and/or network element such as a switch may send its console diagnostic output as items that each is a line of text in a file or stream of items. For example, step 502 may detect that a device may be hijacked, spoofed, or malfunctioning.

Step 503 detects a network intrusion based on the adaptive anomaly threshold. For example, lines of text in server logs or network packets relayed by a firewall or network element such as a switch may arrive as items in a file or stream of items, and an item may be detected as anomalous and possibly malicious.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
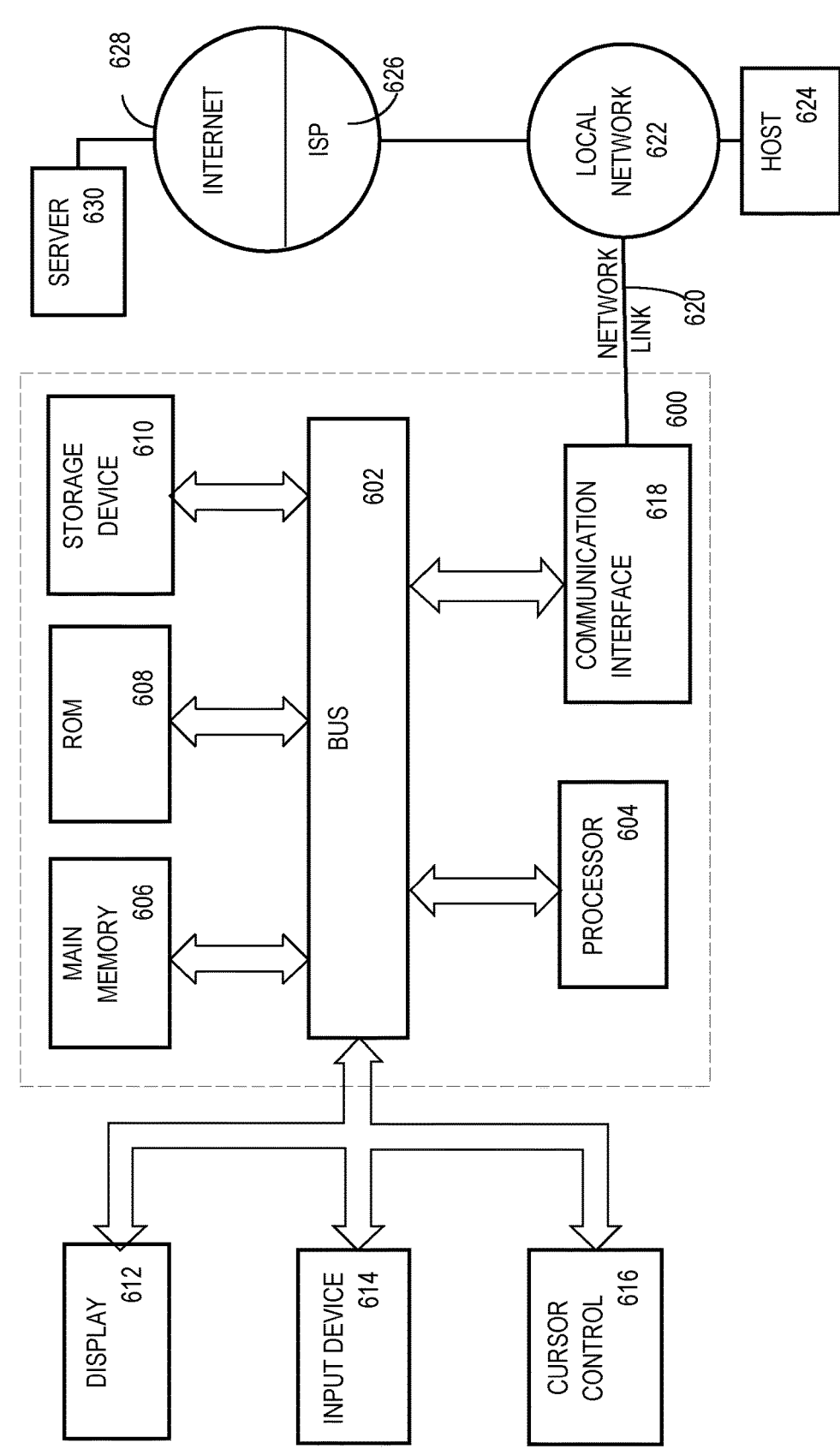
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable)

implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

receiving a feature aggregation in a stream of feature aggregations;

calculating, by a machine learning (ML) model, an anomaly score for said feature aggregation;

deciding said feature aggregation is anomalous when said anomaly score exceeds an adaptive anomaly threshold that is less than one; and sequentially:

adjusting a moving standard deviation of anomaly scores based on a moving average of anomaly scores, adjusting said moving average of anomaly scores based on said anomaly score, and decreasing said adaptive anomaly threshold based on said moving average of anomaly scores and said moving standard deviation of anomaly scores;

wherein the method is performed by one or more computers.

2. The method of claim 1 wherein said decreasing said adaptive anomaly threshold based on said moving average of anomaly scores comprises adjusting said adaptive anomaly threshold based on an exponential moving average of anomaly scores.

3. The method of claim 1 wherein said decreasing said adaptive anomaly threshold based on said moving standard deviation of anomaly scores comprises adjusting said adaptive anomaly threshold based on an exponential moving standard deviation of anomaly scores.

4. The method of claim 1 further comprising initializing the moving standard deviation of anomaly scores based on a standard deviation of a plurality of early anomaly scores.

5. The method of claim 4 further comprising calculating, by the ML model, said plurality of early anomaly scores respectively for a plurality of early feature aggregations.

6. The method of claim 1 wherein said calculating said anomaly score for said feature aggregation comprises calculating a normalized anomaly score based on a standard deviation of a plurality of early anomaly scores.

7. The method of claim 1 wherein said calculating said anomaly score for said feature aggregation comprises calculating a normalized anomaly score based on a probability density.

8. The method of claim 1 further comprising initializing the moving average of anomaly scores based on an average of a plurality of early anomaly scores.

9. The method of claim 1 further comprising:

receiving a second feature aggregation in said stream of feature aggregations;

calculating, by said ML model, same said anomaly score for said second feature aggregation;

deciding said second feature aggregation is not anomalous based on said adaptive anomaly threshold.

10. The method of claim 1 wherein said calculating said anomaly score for said feature aggregation comprises said ML model calculating said anomaly score for internet of things (IoT) telemetry.

11. The method of claim 1 wherein said deciding said feature aggregation is anomalous comprises detecting a network intrusion based on said adaptive anomaly threshold.

12. The method of claim 1 wherein said deciding said feature aggregation is anomalous comprises detecting a console log message is anomalous based on said adaptive anomaly threshold.

13. One or more non-transitory computer-readable storage media storing instructions that, when executed by one or more processors, cause:

receiving a feature aggregation in a stream of feature aggregations;

calculating, by a machine learning (ML) model, an anomaly score for said feature aggregation;

deciding said feature aggregation is anomalous when said anomaly score exceeds an adaptive anomaly threshold that is less than one; and sequentially:

adjusting a moving standard deviation of anomaly scores based on a moving average of anomaly scores, adjusting said moving average of anomaly scores based on said anomaly score, and decreasing said adaptive anomaly threshold based on said moving average of anomaly scores and said moving standard deviation of anomaly scores.

14. The one or more non-transitory computer-readable storage media of claim 13 wherein said decreasing said adaptive anomaly threshold based on said moving average of anomaly scores comprises adjusting said adaptive anomaly threshold based on an exponential moving average of anomaly scores.

15. The one or more non-transitory computer-readable storage media of claim 13 wherein said decreasing said adaptive anomaly threshold based on said moving standard deviation of anomaly scores comprises adjusting said adaptive anomaly threshold based on an exponential moving standard deviation of anomaly scores.

16. The one or more non-transitory computer-readable storage media of claim 13 wherein the instructions further cause initializing the moving standard deviation of anomaly scores based on a standard deviation of a plurality of early anomaly scores.

17. The one or more non-transitory computer-readable storage media of claim 13 wherein said calculating said anomaly score for said feature aggregation comprises calculating a normalized anomaly score based on a standard deviation of a plurality of early anomaly scores.

18. The one or more non-transitory computer-readable storage media of claim 13 wherein said calculating said anomaly score for said feature aggregation comprises calculating a normalized anomaly score based on a probability density.

19. The one or more non-transitory computer-readable storage media of claim 13 wherein said deciding said feature aggregation is anomalous comprises detecting a network intrusion based on said adaptive anomaly threshold.

20. The one or more non-transitory computer-readable storage media of claim 13 wherein said deciding said feature aggregation is anomalous comprises detecting a console log message is anomalous based on said adaptive anomaly threshold.

* * * * *